United States Patent
Hori (10) Patent No.: US 11,736,649 B2
(45) Date of Patent: Aug. 22, 2023

(54) IMAGE FORMING DEVICE DETERMINING WHETHER AUTHENTICATION SKIPPING CONDITION IS SATISFIED

(71) Applicant: BROTHER KOGYO KABUSHIKI KAISHA, Nagoya (JP)

(72) Inventor: Toshikazu Hori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 387 days.

(21) Appl. No.: 17/146,537

(22) Filed: Jan. 12, 2021

(65) Prior Publication Data
US 2021/0227091 A1 Jul. 22, 2021

(30) Foreign Application Priority Data
Jan. 20, 2020 (JP) .................................. 2020-006659

(51) Int. Cl.
*H04N 1/44* (2006.01)
*G06F 21/44* (2013.01)

(52) U.S. Cl.
CPC ........... *H04N 1/4413* (2013.01); *G06F 21/44* (2013.01); *H04N 1/4433* (2013.01); *G06F 2221/2149* (2013.01)

(58) Field of Classification Search
CPC .... H04N 1/4413; H04N 1/4433; G06F 21/44; G06F 2221/2149
See application file for complete search history.

(56) References Cited

U.S. PATENT DOCUMENTS

| 2010/0208286 A1* | 8/2010 | Iwata | G06F 21/608 358/1.14 |
| 2016/0004851 A1* | 1/2016 | Suzuki | G06F 21/31 726/7 |

FOREIGN PATENT DOCUMENTS

| JP | 2007171557 A | * 7/2007 |
| JP | 2007-313795 A | 12/2007 |
| JP | 2012-222645 A | 11/2012 |
| JP | 2013-29887 A | 2/2013 |

* cited by examiner

*Primary Examiner* — Matthew T Henning
(74) *Attorney, Agent, or Firm* — Scully, Scott, Murphy & Presser, PC (57) ABSTRACT

In an image forming device, an image forming engine is configured to form an image. A memory stores configuration information and a device password. In a case where a storage medium is connected to the input output interface, the controller determines whether an authentication skipping condition is satisfied. The authentication skipping condition including a condition that the device password is maintained to an initial value. The controller imports the setting configuration information from the storage medium to the memory without performing authentication using the device password in a case where the authentication skipping condition is satisfied. The controller imports the setting configuration information from the storage medium to the memory after performing authentication using the device password in a case where the authentication skipping condition is not satisfied. After the import configuration information is imported, the controller operates according to the import configuration information.

8 Claims, 10 Drawing Sheets

IMPORT CONFIGURATION INFORMATION (Backup.json)
220

INSTALLATION SITE: Team1
CONTACT E-MAIL ADDRESS: team1@mail.co.jp

IP Address: 123.456.123.456
MailServer: 123.123.123.456

DEVICE PASSWORD: AAABBB

SCAN SETTINGS
　DISPLAY NAME: ScanToMike
　DESTINATION INFORMATION: 123.123.123.123
　SCANNING RESOLUTION: 300dpi
　DUPLEX SCAN SETTING: ON
　COLOR SETTING: ON

COPY SETTINGS
　DISPLAY NAME: Copy1
　SCANNING RESOLUTION: 200dpi
　DUPLEX SCAN SETTING: ON
　COLOR SETTING: ON
　DUPLEX PRINT SETTING: ON

IMPORT INSTRUCTION INFORMATION <Import.txt>                    210

```
DEVICEPASSWORD=nimda
DATAPASSWORD=abcdefg
REPLACED=settings.network.wired_network.tcp_ip.ip_address:"192.168.1.0",%S%X12345J5N790125
REPLACED=settings.network.wired_network.tcp_ip.ip_address:"192.168.1.1",%S%X12345J5N790143
REPLACED=settings.network.wired_network.tcp_ip.ip_address:"192.168.1.2",%S%X12345J5N790188
```

FIG. 10 (b)

<Iplist.txt>                                                   230

| Serial No. | IP Address | Node Name |
|---|---|---|
| X12345J5N790125 | 192.1681.0 | alpha |
| X12345J5N790143 | 192.1681.1 | beta |
| X12345J5N790188 | 192.1681.2 | gamma |
| ⋮ | ⋮ | ⋮ | ns # IMAGE FORMING DEVICE DETERMINING WHETHER AUTHENTICATION SKIPPING CONDITION IS SATISFIED

CROSS REFERENCE TO RELATED APPLICATION

This application claims priority from Japanese Patent Application No. 2020-006659 filed Jan. 20, 2020. The entire content of the priority application is incorporated herein by reference.

TECHNICAL FIELD

The present disclosure relates to a technique to set configuration information on an image forming device (information processing device).

BACKGROUND

An information processing device (image-forming device) known in the art imports device configuration information stored in a USB memory or another storage medium as its own device configuration information. When importing configuration information from the USB memory, the image-forming device performs login authentication based on a piece of authentication information stored in the USB memory. If login authentication is successful, the image-forming device imports the configuration information.

SUMMARY

However, in the conventional technique, in a case where different pieces of authentication information are set for different devices, the configuration information cannot be imported to such devices by using a single USB memory.

In view of the foregoing, it is an object of the present disclosure to provide a technique that enables importing configuration information to a plurality of devices by using a single storage medium.

In order to attain the above and other objects, the disclosure provides an image forming device. The image forming device includes an image forming engine, a memory, an input output interface, and a controller. The image forming engine is configured to form an image. The memory stores configuration information and a device password. The controller is configured to operate based on the configuration information. The controller configured to perform: in a case where a storage medium is connected to the input output interface: determining whether an authentication skipping condition is satisfied, the authentication skipping condition including a condition that the device password is maintained to an initial value; importing the setting configuration information from the storage medium to the memory without performing authentication using the device password in a case where the authentication skipping condition is satisfied; and importing the setting configuration information from the storage medium to the memory after performing authentication using the device password in a case where the authentication skipping condition is not satisfied. After the import configuration information is imported, the controller operates according to the import configuration information.

According to another aspect, the disclosure provides a method for controlling an image forming device. The image forming device includes: a memory storing configuration information and a device password, the configuration information; and an input output interface. The image forming device operates according to the configuration information. The method includes: in a case where a storage medium is connected to the input output interface: determining whether an authentication skipping condition is satisfied, the authentication skipping condition including a condition that the device password is maintained to an initial value; importing the setting configuration information from the storage medium to the memory without performing authentication using the device password in a case where the authentication skipping condition is satisfied; and importing the setting configuration information from the storage medium to the memory after performing authentication using the device password in a case where the authentication skipping condition is not satisfied. After the import configuration information is imported, the image forming device operates according to the import configuration information.

BRIEF DESCRIPTION OF THE DRAWINGS

The particular features and advantages of the disclosure as well as other objects will become apparent from the following description taken in connection with the accompanying drawings, in which:

FIG. 10(*a*) is an explanatory diagram illustrating import instruction information; and FIG. 10(*b*) is an explanatory diagram illustrating a list.

DETAILED DESCRIPTION

An embodiment of an information processing device is described while referring to accompanied drawings.

Figure 1:
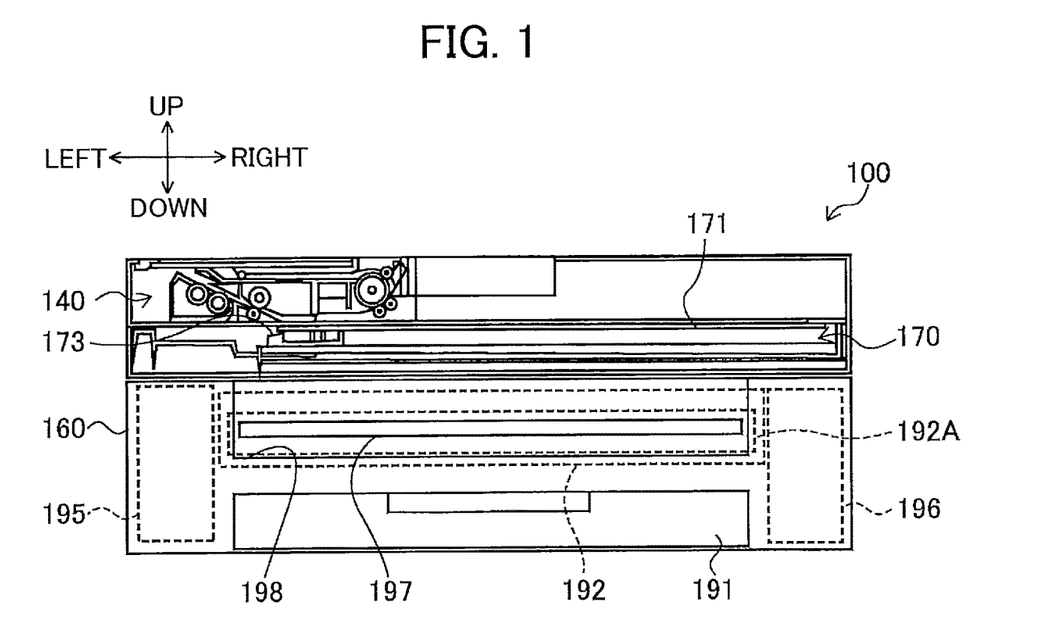
FIG. 1 is a front view of a multifunction peripheral according to an embodiment.
Figure 2:
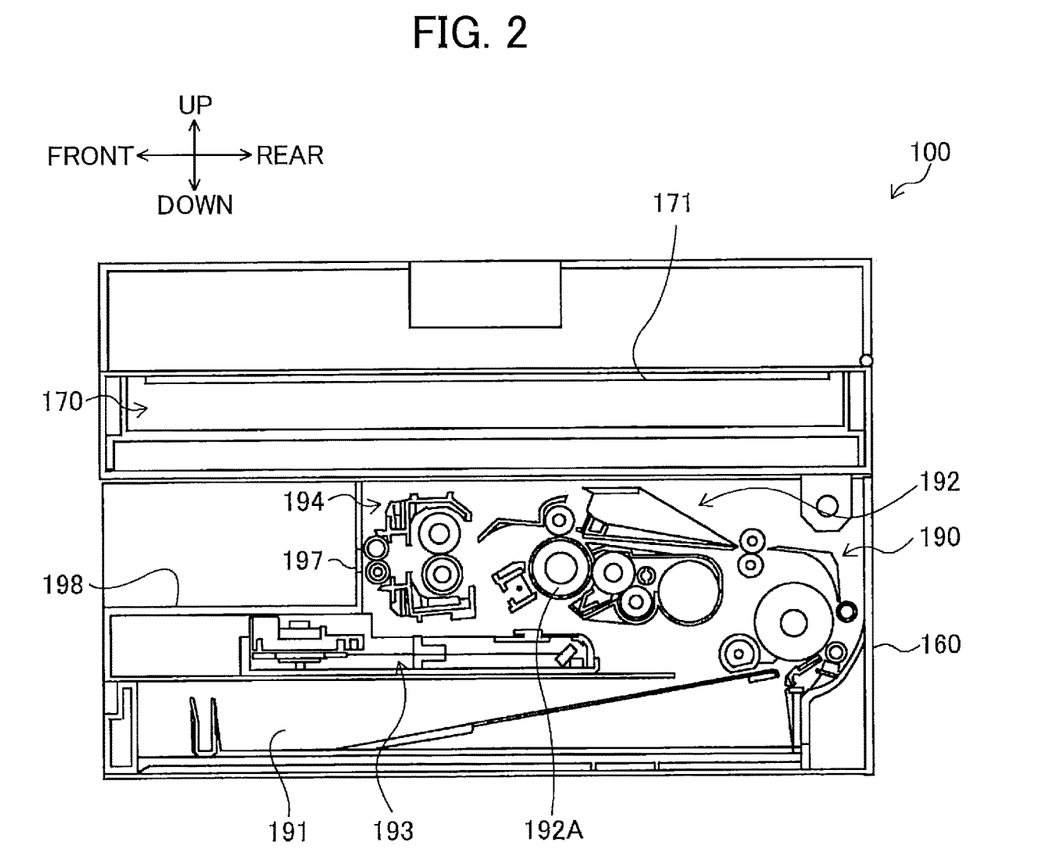
FIG. 2 is a cross sectional side view of the multifunction peripheral shown in FIG. 1.

First, a general hardware configuration of a multifunction peripheral 100 will be described with reference to FIGS. 1 and 2. The multifunction peripheral 100 is an example of the information processing device of the present disclosure according to the embodiment. Hereinafter, multifunction peripheral will be abbreviated as "MFP." Directions referred to in the following description will conform to the directions indicated by arrows in FIGS. 1 and 2.

The MFP 100 has a main casing 160 and, within the main casing 160, a scanning unit 170 and an image-forming unit 190.

The scanning unit 170 includes an original platen 171 for supporting an original document to be scanned, and an image sensor 173 that reads images of originals placed on the original platen 171. The MFP 100 also includes an automatic document feeder 140 for conveying an original. The image sensor 173 reads an image of the original conveyed by the automatic document feeder 140 while the image sensor 173 is stationary.

The image-forming unit 190 is disposed beneath the scanning unit 170 and has a paper cassette 191, a process unit 192, an exposure device 193, a thermal fixing device 194, a power supply device 195, a drive mechanism 196, a discharge opening 197, and a sheet retrieval opening 198. Using a laser beam outputted from the exposure device 193, the image-forming unit 190 prints images on paper conveyed from the paper cassette 191 based on inputted image data. The image-forming unit 190 performs printing according to control by a control unit primarily configured of a central processing unit (CPU) 101 of the MFP 100 described later (see FIG. 3).

The paper cassette 191 accommodates sheets of a recording medium, such as papers, in a stacked state. The paper cassette 191 is detachably mountable in the main casing 160.

The process unit 192 is detachably mounted in a prescribed position above the exposure device 193. The process unit 192 has a photosensitive drum 192A and, while not shown in the drawings, a charger that applies a uniform charge to the outer circumferential surface of the photosensitive drum 192A, a developing roller that supplies toner to an electrostatic latent image formed on the surface of the photosensitive drum 192A, a supply roller that supplies toner to the developing roller, a thickness-regulating blade that regulates the thickness of the toner layer on the developing roller, a toner-accommodating section that accommodates toner to be supplied by the supply roller, and a transfer roller that transfers toner from the outer circumferential surface of the photosensitive drum 192A onto a sheet of paper.

The photosensitive drum 192A is rotatably supported inside the process unit 192. The photosensitive drum 192A is configured of an electrically conductive drum body having a cylindrical shape. The photosensitive drum 192A also has an electrostatically chargeable photosensitive layer formed on the outer circumferential surface of the drum body. The laser beam emitted from the exposure device 193 forms an electrostatic latent image on the photosensitive layer of the photosensitive drum 192A corresponding to an image to be printed.

The exposure device 193 is disposed in the lower section of the main casing 160. The exposure device 193 has a laser light-emitting unit, a polygon mirror, lenses, and reflecting mirrors. Laser light is emitted from the laser light-emitting unit based on an image to be formed on paper. The emitted laser light passes through or is reflected by the polygon mirror, lenses, and reflecting mirrors to be irradiated onto the surface of the photosensitive drum 192A constituting the process unit 192. An electrostatic latent image corresponding to the image to be printed is formed on the surface of the photosensitive drum 192A by this laser light.

The thermal fixing device 194 is disposed between the process unit 192 and the discharge opening 197. The thermal fixing device 194 has a heating roller, and a pressure roller. Toner transferred onto the paper by the process unit 192 is heated and melted by the heating roller and pressure roller provided in the thermal fixing device 194, thereby thermally fixing the toner image to the paper.

The power supply device 195 is disposed in the main casing 160 to the left of the process unit 192 and the like. The power supply device 195 functions to supply power to components in the image-forming unit 190 for performing image formation. The drive mechanism 196 is disposed in the main casing 160 to the right of the process unit 192 and the like. The drive mechanism 196 transfers a drive force to the photosensitive drum 192A and the like for forming images with the image-forming unit 190.

The discharge opening 197 and the sheet retrieval opening 198 are formed in the front surface side of the main casing 160 above the paper cassette 191, which is detachably mountable in the main casing 160. The discharge opening 197 is formed in a position corresponding to the thermal fixing device 194. After images are formed on a sheet by the image-forming unit 190, the sheet is discharged through the discharge opening 197. The sheet retrieval opening 198 is an area in which sheets discharged through the discharge opening 197 are stacked.

Figure 3:
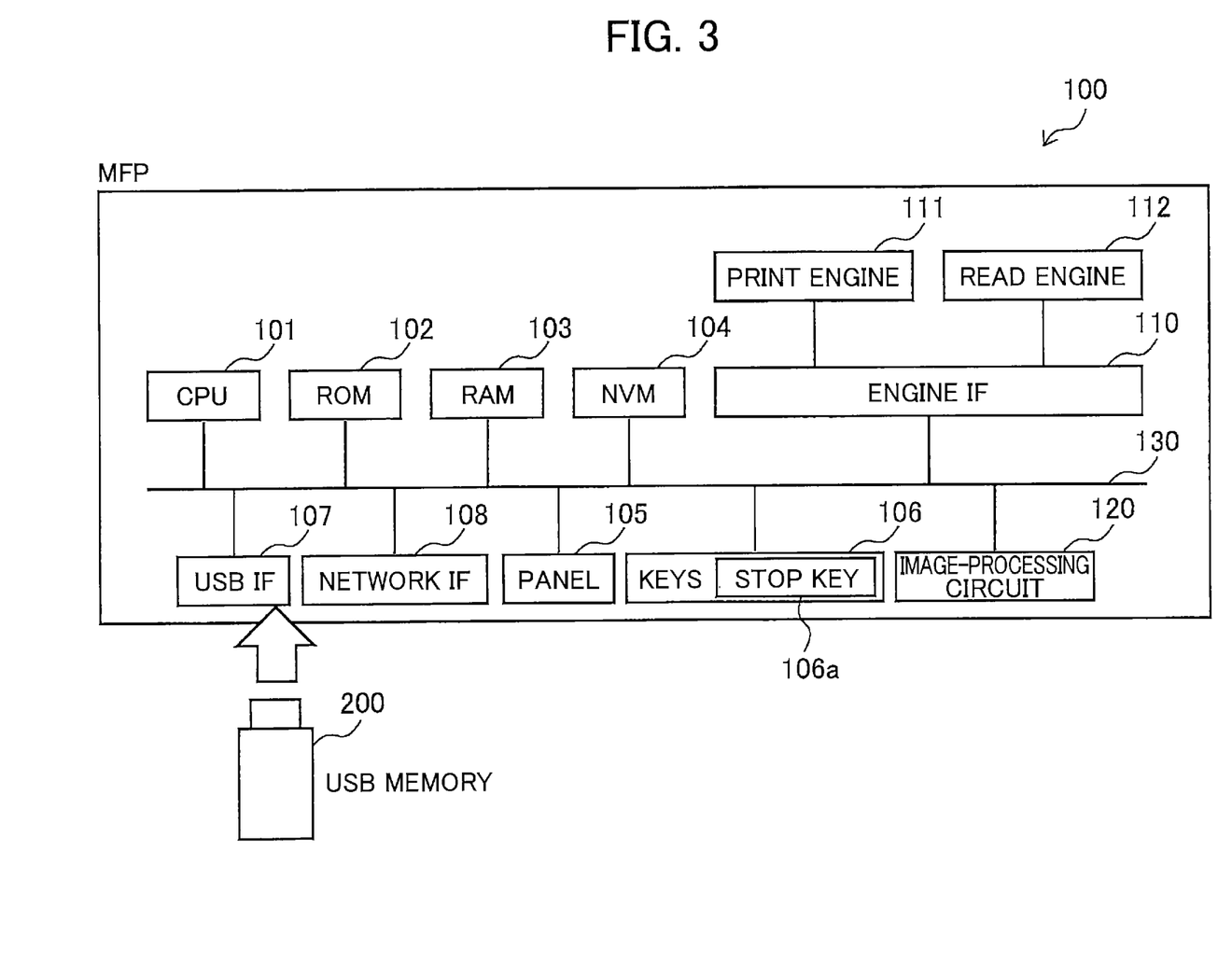
FIG. 3 is a block diagram illustrating control configuration of the multifunction peripheral shown in FIG. 1.

Next, the control configuration of the MFP 100 will be described with reference to FIG. 3.

The MFP 100 is provided with a CPU 101, a read-only memory (ROM) 102, a random-access memory (RAM) 103, a nonvolatile memory (NVM) 104, a print engine 111, a read engine 112, and various interfaces. The interfaces include an engine interface 110, a Universal Serial Bus (USB) interface 107, and a network interface 108. The print engine 111 and read engine 112 are connected to the engine interface 110.

The CPU 101 controls overall operations of the MFP 100. The CPU 101 controls the print engine 111 and the read engine 112 via the engine interface 110 according to configuration information.

The ROM 102 is a memory that stores a control program executed by the CPU 101. The CPU 101 reads the control program from the ROM 102 to execute various processes. The control program includes a program to execute an importing process described later with reference to FIGS. 6 through 8.

The RAM 103 is a memory that temporarily stores image data and the like. The RAM 103 is used either as a storage area for temporarily storing data, signals, and the like used when the CPU 101 executes the control program; or a work area for processing data.

The NVM 104 is nonvolatile memory for storing configuration information and the like.

The MFP 100 is also provided with a panel 105, and keys 106.

The panel 105 is a touchscreen in the embodiment. Various screens are displayed on the panel 105 according to the state of the MFP 100. The operator can perform input operations through the panel 105 by operating input buttons displayed in the screens.

The keys 106 are hard keys, i.e., keys configured in hardware. In the embodiment, the keys 106 include a Stop key 106a. In addition to its normal function for stopping operations of the MFP 100, the Stop key 106a may be given another function, as will be described later with reference to FIG. 4.

The USB interface 107 is an Input/Output interface for connecting to an external USB device. In the embodiment, a USB memory 200 is connected to the USB interface 107 as a storage medium. USB memory is sometimes referred to as USB flash memory or a USB flash drive.

The network interface 108 functions to connect the MFP 100 to a communication network. The communication network may be a wired or wireless local area network (LAN). The network interface 108 may be one of a LAN interface or wireless LAN (WLAN) interface, or both.

The print engine 111 is a device used to print images on sheets and has an electrophotographic, inkjet, or thermal type printing device. In the embodiment, the print engine 111 corresponds to the image-forming unit 190 described above and, hence, has an electrophotographic printing device.

The read engine 112 is a device used to read images from originals and possesses reading devices, such as charge-coupled devices (CCDs) or a contact image sensor (CIS). In the embodiment, the read engine 112 corresponds to the scanning unit 170 described above.

The engine interface 110 is the interface that controls the print engine 111 and the read engine 112. The engine interface 110 is provided with the power supply device 195 that supplies power for performing image formation, and the like.

The MFP 100 is further provided with an image-processing circuit 120.

The image-processing circuit 120 executes a rasterization process on image data for a print job, and outputs the rasterized data to the print engine 111. The image-processing circuit 120 also converts image data read from an original by the read engine 112 to digital data. The digital data converted from the image data may then be transmitted externally via the network interface 108 or supplied to the print engine 111 to be outputted onto a sheet.

The CPU 101, the ROM 102, the RAM 103, the NVM 104, the panel 105, the keys 106, the USB interface 107, the network interface 108, the engine interface 110, and the image-processing circuit 120 are interconnected via a bus 130.

Next, an overview of a process to import configuration information stored in the USB memory 200 into the MFP 100 will be described with reference to FIGS. 4 and 5. FIG. 5 shows an example of plaintext import configuration information 220. The plaintext import configuration information 220 includes at least one of setting values to be imported to the MFP 100. That is, the plaintext import configuration information 220 includes at least one of the installation site of the MFP 100, the contact address for the user of the MFP 100, the Internet Protocol (IP) address of the MFP 100, the LP address of the server or other external device to which the MFP 100 is connected, scan settings, and copy settings.

Figure 4:
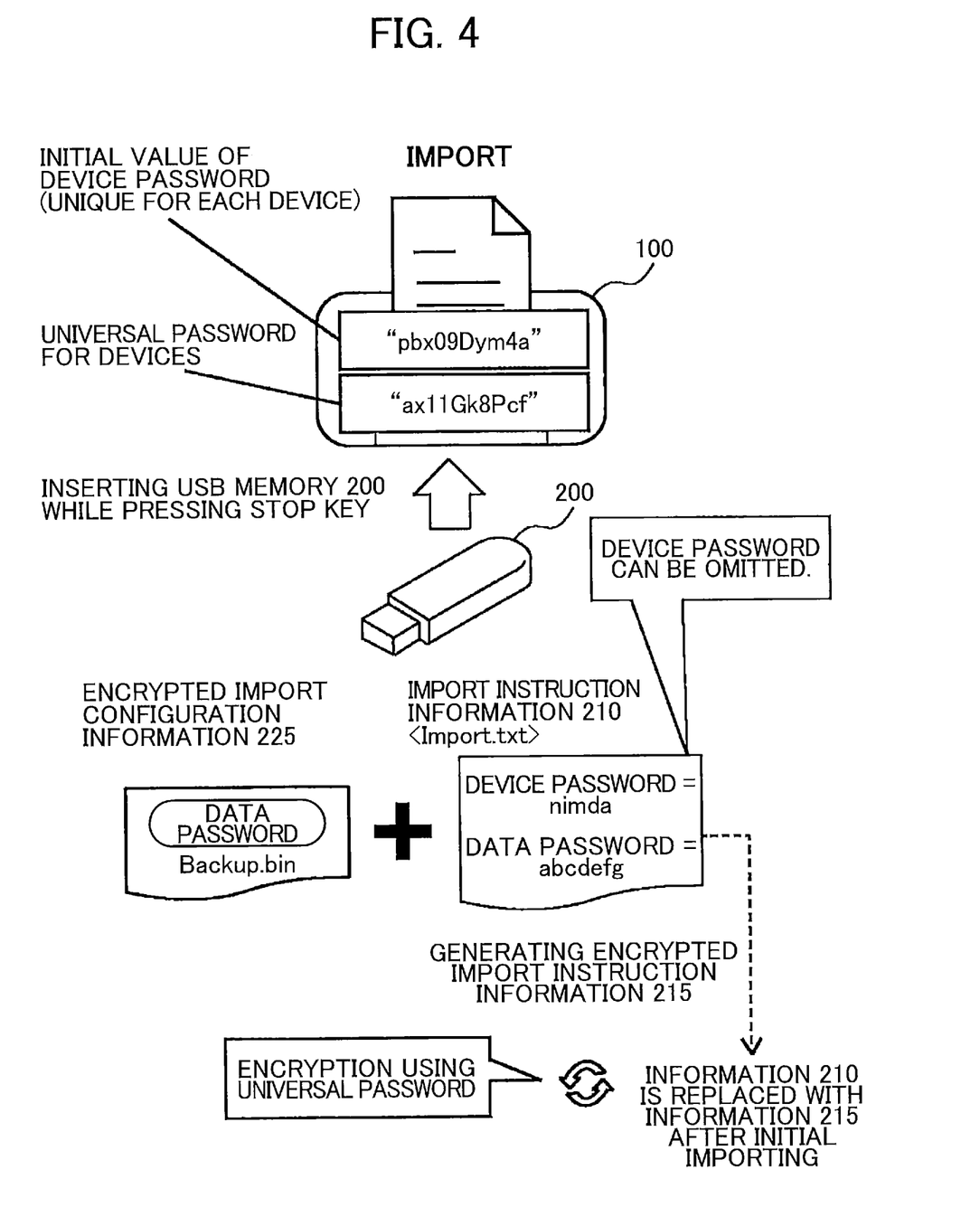
FIG. 4 is an explanatory diagram illustrating an overview of operations to import configuration information from a USB memory.
Figure 5:
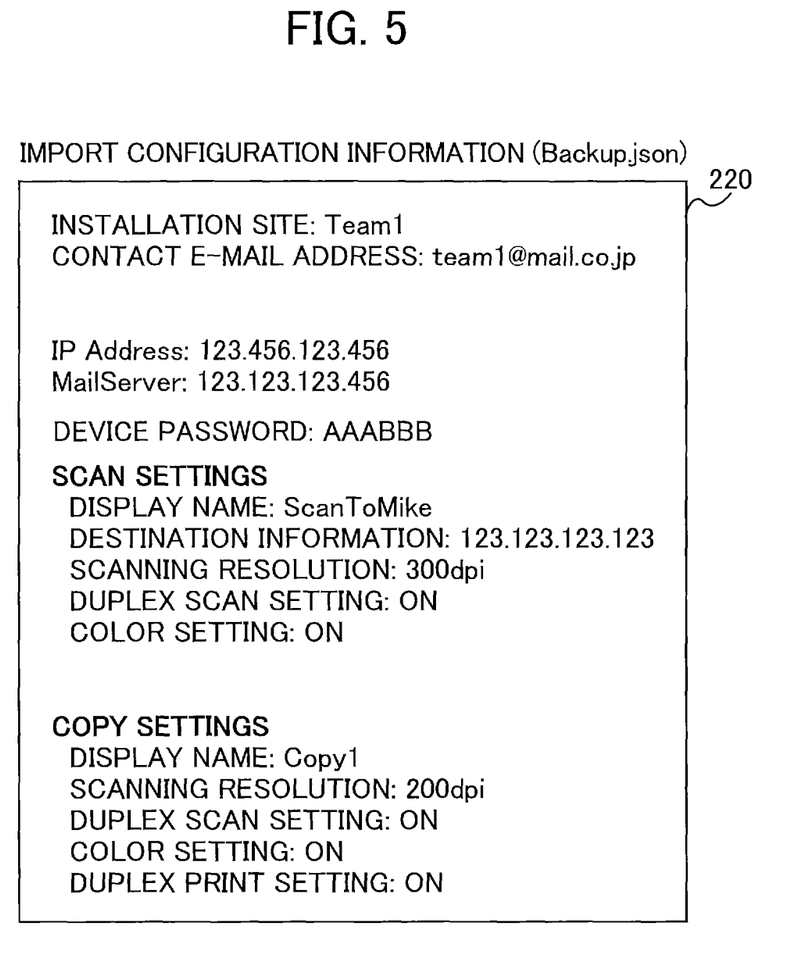
FIG. 5 is an explanatory diagram illustrating an example of the configuration information stored in the USB memory.

As shown in FIG. 4, a device password and a universal password that is universal for devices are stored in the NVM 104 of the MFP 100, for example. The term "device" in the embodiment signifies an MFP, such as the MFP 100. The device password is used for login authentication when a user or a device logs in to the MFP 100. When the devices are in their initial states, the device password is unique for each device. Thus, the initial value of a device password is the password that was set for the device in its initial state. Therefore, the device password for the MFP 100, at least at its initial value, differs from the initial value of the device password for other MFPs. However, the user can modify the device password. For example, the use may set the same device password for a plurality of MFPs 100 that the user owns. The NVM 104 further stores the manufacturing number of the MFP 100.

The universal password, on the other hand, is used for encrypting plaintext import instruction information 210 described later. The same password is stored as the universal password in the NVM of each of a plurality of devices that meet prescribed criteria. These prescribed criteria may include at least one of criteria that a subject device has the same (or specific) specifications, criteria that the subject device can import the same (or specific) plaintext import configuration information 220, criteria that the subject device has the same (or specific) firmware, and criteria that the subject device is produced by the same (or specific) manufacturer, for example. The universal password is confidential information that the user cannot view. The universal password is also not included in the plaintext import configuration information 220 and cannot be modified in the importing process, but the universal password can be modified when updating firmware for the MFP 100.

In the example of FIG. 4, the USB memory 200 stores a Backup.bin file, which includes encrypted import configuration information 225; and an Import.txt file, which includes nonencrypted, i.e., plaintext, import instruction information 210.

The Backup.bin file is a binary file created by encrypting a Backup.json file using a data password. Here, the Backup.json file includes the plaintext import configuration information 220 (see FIG. 5). The Backup.json file is a file in the JavaScript (registered trademark) Object Notation (JSON) format. Here, the Backup.bin file may be generated by compressing the Backup.json file according to the ZIP compression format and encrypting the resulting data according to the Advanced Encryption Standard (AES) scheme using the data password. Another compression method, such as the LZH compression format, may be employed in place of ZIP. Further, other encryption schemes, such as the Data Encryption Standard (DES), may be used in place of AES. Alternatively, the Backup.bin file may be generated using only an encryption process while omitting the compression process.

The Import.txt file is a file in the text format. In the example of FIG. 4, the Import.txt file includes "nimda" as the device password for authentication, and "abcdefg" as the data password. The user can edit the Import.txt file. For example, the user can change the device password so as to correspond to a target device for authentication. The user may generate a new Import.txt file and replace the old Import.txt file with the new Import.txt file in the USB memory 200. The Import.txt file may not include the device password.

The Stop key 106a is a special key. When the operator inserts the USB memory 200 into the USB interface 107 while pressing the Stop key 106a, the MFP 100 executes operations in an import mode to import configuration information from the USB memory 200 into the NVM 104. The "operations in the import mode" in FIG. 4 specifically denote operations to generate plaintext import configuration information 220 by decrypting the encrypted import configuration information 225 stored in the USB memory 200 and to import the plaintext import configuration information 220 into the NVM 104. The "operations in the import mode" in FIG. 4 may denote operations to import the plaintext import configuration information 220 stored in the USB memory 200 into the NVM 104. On the other hand, if the user inserts the USB memory 200 into the USB interface 107 without pressing the Stop key 106a, the MFP 100 executes normal operations in a USB memory mode, such as operations for printing print data stored in the USB memory 200 or operations for storing scanned data in the USB memory 200.

When importing configuration information into the NVM 104, the CPU 101 determines whether the MFP 100 satisfies a condition for skipping authentication. In a case where the MFP 100 determines that the condition is met, the CPU 101 skips the authentication process for authenticating the device password included in the Import.txt file with a device password in the NVM 104 and permits configuration information to be imported into the NVM 104. However, in a case where the MFP 100 does not satisfy the condition for skipping authentication, the CPU 101 does not skip the authentication process and only allows configuration information to be imported into the NVM 104 if authentication is successful. Here, the "condition for skipping authentication"

is that the MFP 100 is in its initial state, as will be described later with reference to FIG. 6. The authentication process is skipped in a case where the MFP 100 has satisfied this condition for skipping authentication in this way in order to simplify importing operations when configuration information is to be imported into a plurality of MFPs from the same USB memory 200. That is, in a conceivable case where the authentication process must always be performed to execute importing operations using different authentication information for each MFP, the user would have to expend much time and effort on authentication processes, despite performing operations to import the same configuration information into a plurality of MFPs. Accordingly, efficient importing operations cannot be performed. Note that in the embodiment, the "authentication information" is the device password stored in the NVM of each MFP, for example.

Once the importing of configuration information into the NVM 104 is complete, the CPU 101 encrypts the plaintext import instruction information 210 using the universal password to generate encrypted import instruction information 215. The CPU 101 further deletes the plaintext import instruction information 210 to replace the plaintext import instruction information 210 with the encrypted import instruction information 215. At an initial state, the plaintext import instruction information 210 is stored in the USB memory 200 as the Import.txt file. Next, in a case where the first importing operation is executed while using the USB memory 200 in the initial state, the plaintext import instruction information 210 is replaced with the encrypted import instruction information 215. Thus, in the second and subsequent importing operations, the encrypted import instruction information 215 is stored in the USB memory 200 as an Import.bin file. Here, the plaintext import instruction information 210 is encrypted in this way to enhance security of the import instruction information. Further, since the password used for encryption is a common password among like devices and a decryption process need not be performed using a different password for each device, there is very little increase in the time and effort required for the decryption process. Note that the encryption method used for encrypting the plaintext import instruction information 210 may be the same as or different from the encryption method used when encrypting the plaintext import configuration information 220.

FIG. 4 illustrates an example of the first importing operation. After completing this operation, the USB memory 200 stores the encrypted import configuration information 225 and the encrypted import instruction information 215. Hence, in a case where this same USB memory 200 is subsequently used to import configuration information into a different MFP meeting the same criteria as the MFP 100 (i.e., in second and subsequent importing operations), the CPU 101 first decrypts the encrypted import instruction information 215 using the universal password to generate the plaintext import instruction information 210. The remaining steps of the process are identical to the process described above. When the USB memory 200 already stores the encrypted import instruction information 215, the CPU 101 may not perform a process to encrypt (S48 described later) and replace the plaintext import instruction information 210 (S50 described later). The import instruction information 210 and 215 is for instructing the importing process, especially a configuration information writing process (S46) described later, to use information therein such as the device password and the data password.

As described above, the JSON format is used as the data format for the plaintext import configuration information 220. However, the data in FIG. 5 has been written in a different format from the JSON format for convenience. Naturally, the data format in which configuration information is stored is not limited to JSON but may be another format such as the comma-separated values (CSV) format.

The plaintext import configuration information 220 in the example of FIG. 5 includes the installation site "Team1" for the MFP 100, the contact e-mail address "team1@mail.co.jp" for the user of the MFP 100, the IP address "123.456.123.456" of the MFP 100, the IP address "123.123.123.456" of the mail server, scan settings, and copy settings. The plaintext import configuration information 220 also includes the device password "AAABBB" to be set to the MFP 100.

Scan settings are settings for processes involving the read engine 112. The scan settings in FIG. 5 include the display name "ScanToMike," the transmission destination information "123.123.123.123," the scanning resolution "300 dpi," the duplex scan setting "ON," and the color setting "ON."

The display name is information for displaying a configuration name on the panel 105 of the MFP 100.

The transmission destination information is an address to which image data for a scanned image is transmitted through a communication network by using the network interface 108. The transmission destination information is not limited to an IP address, used in the example of FIG. 5, but may be a URL or an e-mail address.

The duplex scan setting is an option for scanning images from both surfaces of an original. A duplex scan setting of "ON" indicates that the option is enabled, while a setting of "OFF" indicates that the option is disabled and signifies a setting for scanning an image from only one surface of the original.

The color setting is an option for reading color images from the original. A color setting of "ON" indicates that the option is enabled, while a setting of "OFF" indicates that the option is disabled and signifies a setting to read images from the original in monochrome.

The CPU 101 displays "ScanToMike" on the panel 105 as the configuration name based on the display name setting "ScanToMike." Here, the above-described configuration information shown in FIG. 5 that corresponds to the display name "ScanToMike" indicates configuration information for settings that the user can select from among a plurality of settings displayed on the panel 105. However, the present invention is not limited to this configuration, and the configuration information may specify settings that are fixed for the MFP. "Fixed" denotes that the user is restricted or prohibited from selecting other settings.

The CPU 101 transmits image data for an image read by the read engine 112 to the IP address 123.123.123.123 based on the scan transmission destination information "123.123.123.123." The CPU 101 controls the read engine 112 to read an image at a resolution of 300 dpi based on the scanning resolution "300 dpi." The CPU 101 controls the read engine 112 to read images from both surfaces of the original based on the duplex scan setting "ON." The CPU 101 controls the read engine 112 to read color images from both surfaces of the original based on the color setting "ON."

Copy settings are settings for processes involving the read engine 112 and print engine 111. In the example of FIG. 5, the copy settings include the display name "Copy1," the scanning resolution "200 dpi," the duplex scan setting "ON," the color setting "ON," and the duplex print setting "ON."

The color setting indicates an option for forming color images on sheets. A setting of "ON" indicates that the option is enabled, while a setting of "OFF" indicates that the option is disabled and signifies a setting for forming monochromatic images on sheets.

The duplex print setting is an option for forming images on both surfaces of a sheet. A setting of "ON" indicates that the option is enabled, while a setting of "OFF" indicates that the option is disabled and signifies a setting for forming images on only one surface of the sheet.

The CPU 101 controls the print engine 111 to form color images on sheets based on the copy setting "Color: On." The CPU 101 controls the print engine 111 to form images on both surfaces of sheets based on the copy setting "Duplex print: On."

Next, the importing process executed by the MFP 100, and specifically the CPU 101, will be described with reference to FIGS. 6 through 10(b). Steps in the flowcharts of FIGS. 6 through 8 describing the importing process are indicated using the notation "S" followed by a step number. At the beginning of the importing process, an initial state flag is set to "0".

Figure 6:
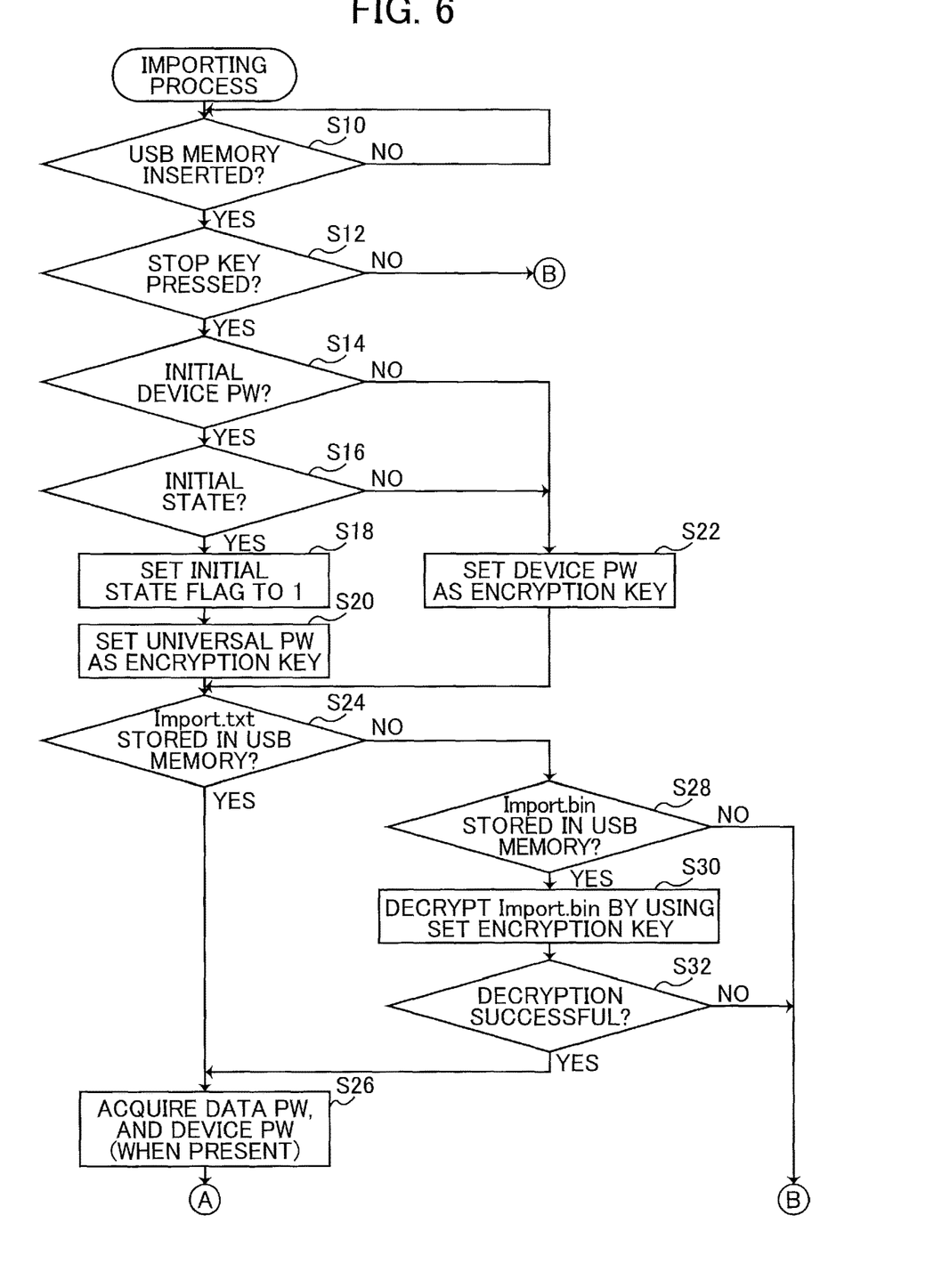
FIG. 6 is a flowchart illustrating a first half of an importing process executed by the multifunction peripheral.

In S10 of FIG. 6, the CPU 101 determines whether the USB memory 200 was inserted into the USB interface 107. While the CPU 101 determines that the USB memory 200 has not been inserted into the USB interface 107 (S10: NO), the CPU 101 waits until the USB memory 200 has been inserted. When the CPU 101 determines that the USB memory 200 has been inserted into the USB interface 107 (S10: YES), in S12 the CPU 101 determines whether the Stop key 106a is being pressed.

In a case where the CPU 101 determines that the Stop key 106a is not being pressed (S12: NO), the CPU 101 ends the importing process since operations in the import mode will not be executed on the MFP 100. However, in a case where the CPU 101 determines that the Stop key 106a is being pressed (S12: YES), the CPU 101 advances to S14. From S14 the CPU 101 executes operations in the import mode.

Thus, in S10 and S12 the CPU 101 determines whether the operator was pressing the Stop key 106a while inserting the USB memory 200 into the USB interface 107.

In S14 the CPU 101 determines whether the device password is its initial value. As described above, the operator can modify the device password. Therefore, in some cases the device password may not be the initial value. Note that password has been abbreviated as "PW" in FIGS. 6 through 8.

In a case where the CPU 101 determines in S14 that the device password is the initial value (S14: YES), in S16 the CPU 101 further determines whether the device (i.e., the MFP 100 in this case) is in its initial state. More specifically, the CPU 101 determines that the MFP 100 is in its initial state based on the following conditions: A) a value that increases while using the MFP 100 is less than or equal to a prescribed value; B) the process unit 192 described above is not mounted in the MFP 100; C) there is no history indicating that the MFP 100 is connected to a network via the network interface 108 described above; and D) a screen that is displayed only once when the MFP 100 is first used after being shipped from the factory has not been displayed.

For the condition A), the "value that increases while using the MFP 100" may be the number of pages printed by the print engine 111 or the number of sheets of originals scanned by the read engine 112, for example. The condition A) may be a condition that all of a plurality of values are less than or equal to corresponding prescribed value. Here, each of the plurality of values increases while using the MFP 100.

Figure 9:
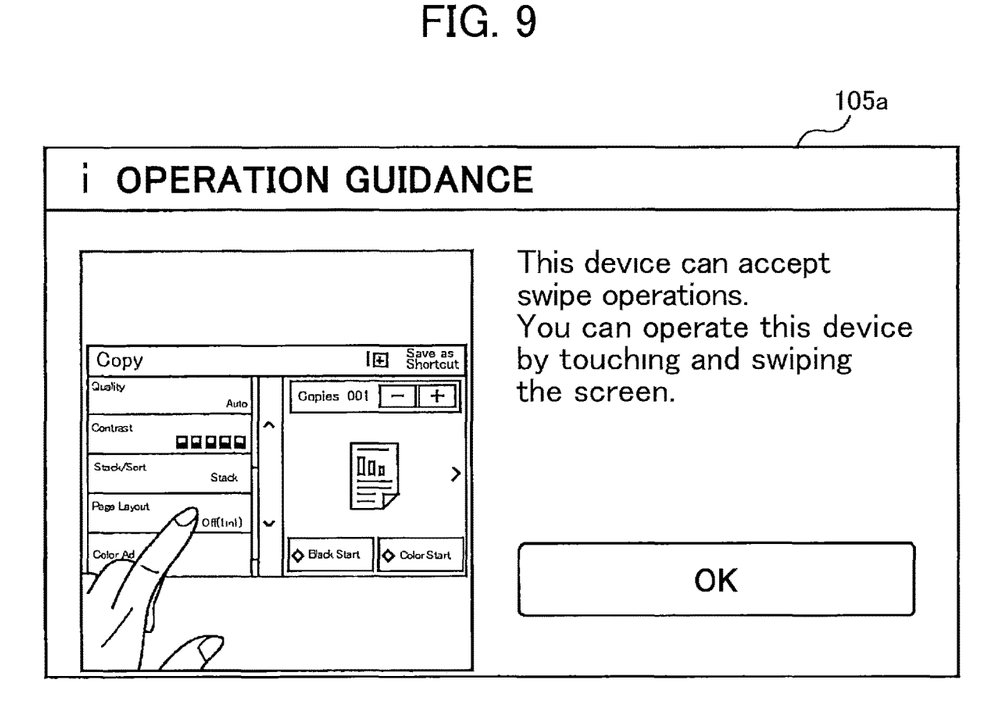
FIG. 9 is an explanatory diagram illustrating an operation guidance screen displayed on a panel.
Figure 10:
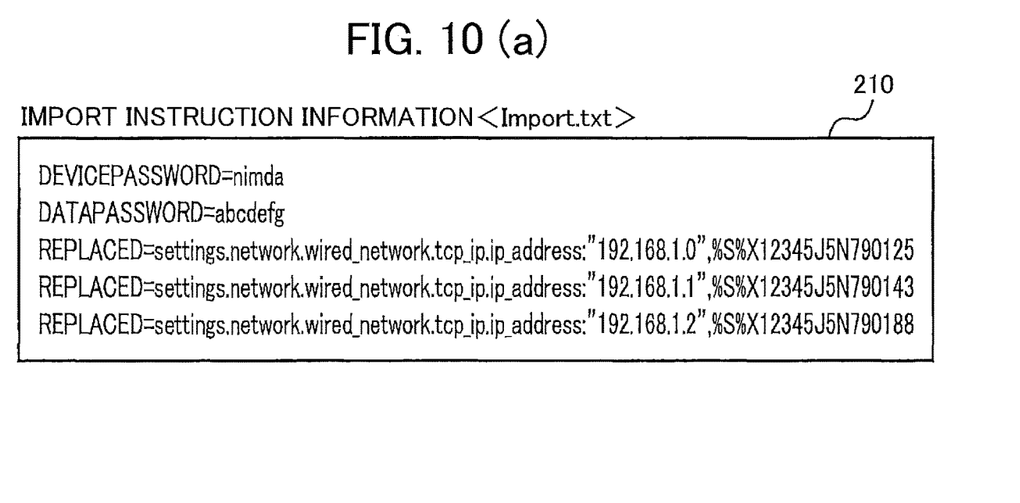

For the condition D), the "screen that is displayed only once" may be an operation guidance screen 105a shown in FIG. 9, for example. If the power to the MFP 100 is turned on the first time after the MFP 100 has been shipped from the factory, the operation guidance screen 105a is displayed once during the process for displaying a home screen on the panel 105. The operation guidance screen 105a is not displayed thereafter. When the operation guidance screen 105a is displayed on the panel 105, the CPU 101 sets an operation guidance screen display flag to "1", for example. Hence, by checking the value of the operation guidance screen display flag, the CPU 101 can determine whether the operation guidance screen 105a has been displayed.

Here, the CPU 101 may determine whether the MFP 100 is in its initial state using only selected one of the conditions A)-D) described above. That is, the CPU 101 may determine that the MFP 100 is in its initial state in a case where selected one of the conditions A)-D) is satisfied. Or, the CPU 101 may determine whether the MFP 100 is in its initial state by taking the logical AND operation of a plurality of selected conditions from among the conditions A)-D). That is, the CPU 101 may determine that the MFP 100 is in its initial state in a case where all of the selected plurality of selected conditions are satisfied. Alternatively, the process of S16 described above may be omitted, and the CPU 101 may determine whether the MFP 100 is in its initial state based solely on whether the condition in S14 is satisfied, i.e., whether the device password is set to its initial value. That is, the CPU 101 may determine that the MFP 100 is in its initial state in a case where the condition in S14 is satisfied.

If the CPU 101 determines in S16 that the device is in its initial state (S16: YES), in S18 the CPU 101 sets an initial state flag to "1", in S20 sets the universal password as an encryption key, and subsequently advances to S24. The initial state flag is a flag set to "1" when the CPU 101 determines that authentication using the device password can be skipped.

On the other hand, in a case where the CPU 101 determines in S14 that the device password is not set to its initial value (S14: NO) or determines in S16 that the device is not in its initial state (S16: NO), in S22 the CPU 101 sets the device password as the encryption key, and subsequently advances to S24.

Thus, in S14 and S16 the CPU 101 determines whether the MFP 100 satisfies the condition for skipping authentication described above (hereinafter, referred to as "authentication skipping condition"). In the embodiment, the authentication skipping condition requires that the device password be set to its initial value and that the MFP 100 is in its initial state. While the CPU 101 in the embodiment determines separately whether the device password is set to its initial value and whether the MFP 100 is in its initial state, a condition to determine whether the MFP 100 is in its initial state may include a condition that the device password be set to its initial value. Or, the authentication skipping condition may only include the condition that the device password be set to its initial value. In this case, the CPU 101 determines that the MFP 100 satisfies the authentication skipping condition when the device password satisfies the condition of being set to its initial value.

In S24 the CPU 101 determines whether an Import.txt file as the plaintext import instruction information 210 is stored in the USB memory 200. If the CPU 101 determines that an Import.txt file is stored in the USB memory 200 (S24: YES), in S26 the CPU 101 acquires the data password and the device password from the Import.txt file, and subsequently advances to S40 in FIG. 7. In the example of FIG. 4, the Import.txt file includes a data password and a device password. A device password may not be included in the Import.txt file. This is because in some cases the user generates data (the Import.txt not having the device password for example) stored in the USB memory 200 assuming that the authentication skipping condition will be met or that the user will input the device password by using the panel 105. Therefore, the qualification "when present" is added in parentheses for S26 in FIG. 6.

On the other hand, if the CPU 101 determines in S24 that an Import.txt file is not stored in the USB memory 200 (S24: NO), in S28 the CPU 101 determines whether an Import.bin file as the encrypted import instruction information 215 is stored in the USB memory 200. In a case where the CPU 101 determines that an Import.bin file is stored in the USB memory 200 (S28: YES), in S30 the CPU 101 decrypts the Import.bin file using the encryption key set in S20 or S22.

In S32 the CPU 101 determines whether decryption was successful (OK). In a case where the CPU 101 determines that encryption was successful, i.e., where the Import.txt file was properly generated based on the Import.bin file (S32: YES), the CPU 101 advances to S26 described above.

However, in a case where the CPU 101 determines in S28 that an Import.bin file is not stored in the USB memory 200 (S28: NO) or in a case where the CPU 101 determines in S32 that encryption failed (S32: NO), the CPU 101 ends the importing process. As described above, when neither the Import.txt file nor the Import.bin file is stored in the USB memory 200, the importing process ends without importing the import configuration information (S46 described above). In other words, when the Import.txt file is present in the USB memory 200, or when the Import.bin file is obtained by decrypting the Import.txt file, importing the import configuration information (S46) is executed. That is, presence of the Import.txt file in the USB memory 200 or acquisition of the Import.txt file from the USB memory 200 indicates instructing (permitting or allowing) to import the import configuration information.

Figure 7:
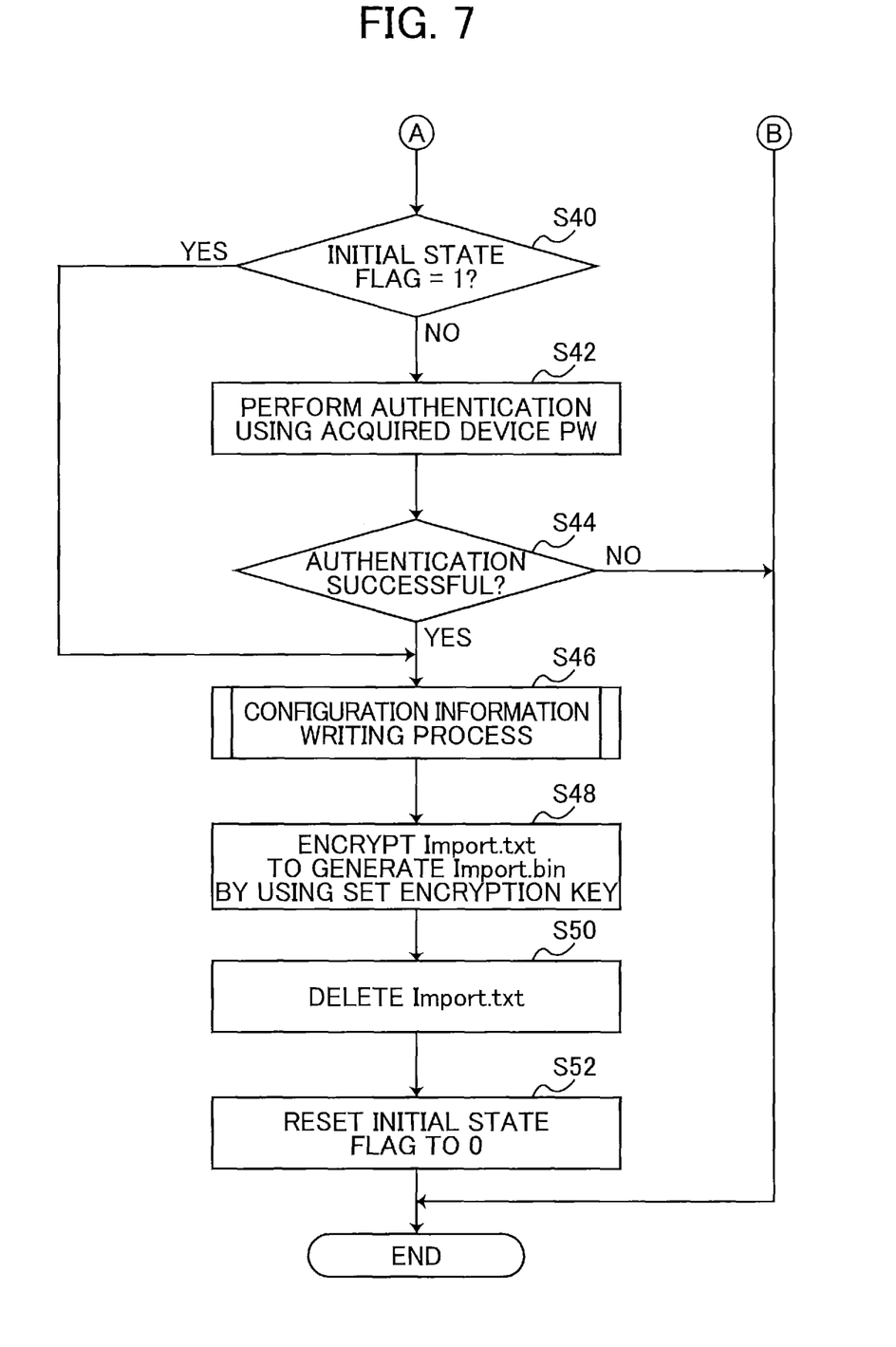
FIG. 7 is a flowchart illustrating a second half of the importing process executed by the multifunction peripheral.

In S40 of FIG. 7, the CPU 101 determines whether the initial state flag is set to "1". In a case where the CPU 101 determines that the initial state flag is not set to "1", i.e., that the initial state flag is "0" (S40: NO), in S42 the CPU 101 executes authentication to login to the MFP 100 using the acquired device password. Here, the CPU 101 uses the device password acquired in S26 described above or prompts the user to input a device password and acquires and uses the device password inputted by the user in response. In the authentication, the CPU 101 compares with the device password stored in the NVM 104 with the device password that is acquired in S26 or is inputted by the user. The authentication is successful when the device information stored in the NVM 104 matches the device password that is acquired in S26 or is inputted by the user.

In S44 the CPU 101 determines whether authentication was successful (OK). In a case where the CPU 101 determines that authentication was successful, i.e., where the user is logged in to the MFP 100 (S44: YES), the CPU 101 advances to S46. However, in a case where the CPU 101 determines that authentication was unsuccessful (S44: NO), the CPU 101 ends the importing process.

Further, in a case where the CPU 101 determined in S40 described above that the initial state flag is set to "1" (S40: YES), the CPU 101 skips S42 and S44 and advances to S46. In this way, the CPU 101 skips authentication with the device password in a case where the initial state flag is "1".

Figure 8:
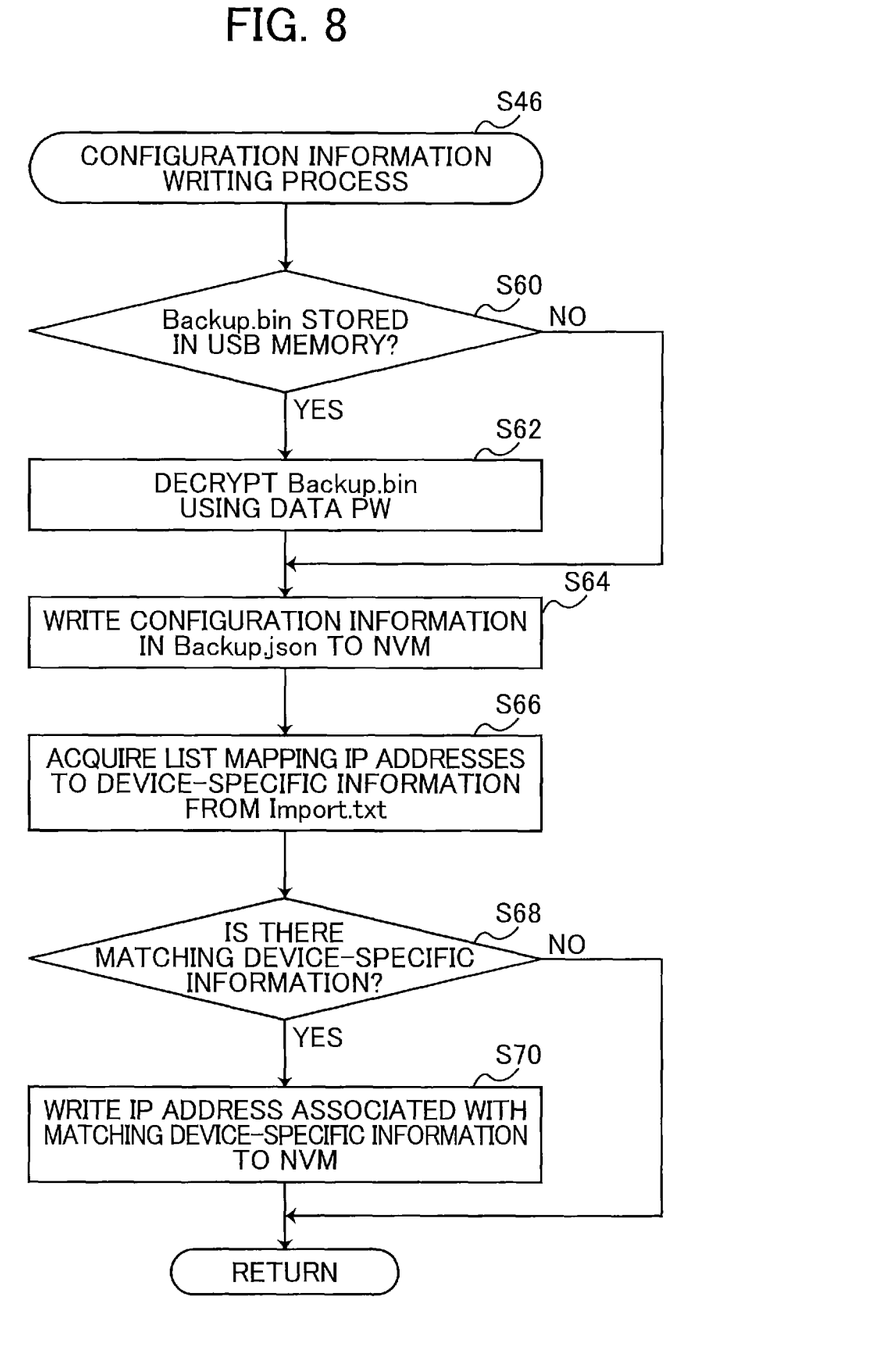
FIG. 8 is a flowchart illustrating a configuration information writing process executed in the importing process.

In S46 the CPU 101 executes a configuration information writing process. FIG. 8 illustrates steps in this configuration information writing process.

In S60 of FIG. 8, the CPU 101 first determines whether a Backup.bin file as the encrypted import configuration information 225 is stored in the USB memory 200. In a case where the CPU 101 determines that a Backup.bin file is stored in the USB memory 200 (S60: YES), in S62 the CPU 101 decrypts the Backup.bin file using the data password acquired in S26, and subsequently advances to S64. Since the data password is included in either the Import.txt file or the Import.bin file, the CPU 101 can acquire the data password to decrypt the Backup.bin file.

However, in a case where the CPU 101 determines in S60 that a Backup.bin file is not stored in the USB memory 200 (S60: NO), the CPU 101 skips S62 and advances to S64.

In S64 the CPU 101 writes the configuration information included in the Backup.json file as the plaintext import configuration information 220 to a prescribed area in the NVM 104. By writing the configuration information 220, the device password included in the Backup.json file is written to the prescribed area in the NVM 104 so as to update the device password. This process enhances security on the MFP 100 since the initial value of the device password stored in the NVM 104 is overwritten by the device password included in the plaintext import configuration information 220. The device password included in the Backup.json file may not be written to the prescribed area in the NVM 10. That is, the device password of the MFP 100 may not be updated.

Note that in a case where configuration information is imported from the USB memory 200, the embodiment assumes that at least one of the Backup.bin file and Backup.json file is stored in the USB memory 200. In addition to this assumption, the embodiment may further assume that at least one of the Import.txt file and Import.bin file always is stored in the USB memory 200. That is, the embodiment may assume that the Import.txt file is always stored in the USB memory 200, or assume that the Import.bin file is always stored in the USB memory 200. The USB memory 200 may not necessarily store one of the Backup.bin file and Backup.json file in such cases. That is, neither of the files may be stored in the USB memory 200. In a case where the CPU 101 detects that neither the Backup.bin file nor Backup.json file is stored in the USB memory 200, the CPU 101 does not execute the importing process.

In S66 the CPU 101 acquires from the Import.txt file a list mapping IP addresses to pieces of device-specific information for individual devices.

FIG. 10(a) shows an example of an Import.txt file as the plaintext import instruction information 210. In addition to the device password (DEVICEPASSWORD=nimda) and the data password (DATAPASSWORD=abcdefg) described above, the Import.txt file also includes IP address settings in the form of a list mapping IP addresses to pieces of individual device-specific information (REPLACED= . . . ). In this list, "192.168.1.0", "192.168.1.1", and "192.168.1.2" are IP addresses, and "X12345J5N790125", "X12345J5N790143", and "X12345J5N790188" following the "%S%" are manufacturing numbers (or serial numbers) serving as examples of pieces of device-specific information unique to individual devices. The "%S%" is an identifier indicating that the following value is a manufacturing number (a serial number). Hence, the Import.txt file stores LP address values in association with manufacturing number (serial numbers). Note that the pieces of device-specific information need not be manufacturing numbers (serial numbers) but may be other information that can identify individual devices, such as Media Access Control (MAC) addresses. The NVM 104 may further store a MAC address of the network interface 108. The IP addresses are pieces of identification information for identifying the MFPs including the MFP 100 on the network. Such pieces of identification information may also be node names or the like in place of the LP addresses.

In S68 the CPU 101 determines whether there is a piece of device-specific information matching that of the MFP 100 itself in the acquired list. That is, the CPU 101 determines in S68 whether the list includes a manufacturing number (a serial number) matching the manufacturing number (serial number) of the MFP 100 stored in the NVM 104. In a case where the CPU 101 determines that the list includes the matching piece of device-specific information, and specifically a matching manufacturing number (serial number) (S68: YES), in S70 the CPU 101 writes the IP address in the list associated with the matching manufacturing number (serial number) to a prescribed area of the NVM 104, and subsequently ends the configuration information writing process so as to update the IP address of the MFP 100. A different IP address must be written (imported) to each MFP. Therefore, the process of S66-S70 described above must be performed to import a different value for each MFP. On the other hand, different values cannot be imported in a conceivable case that simply importing the configuration information stored in the USB memory 200 for each MFP.

Since the configuration information 220 shown in FIG. 5 includes an IP address, the same IP address would be imported into a plurality of MFPs if values for all items (or parameters) in the plaintext import configuration information 220 were imported. However, although the LP address included in the configuration information 220 is imported initially in the process of S64 described above, the process in S66-S70 overwrites this IP address with a different IP address for different MFPs, thereby avoiding the possibility of importing the same IP address into a plurality of MFPs.

Note that after completing the process of S70, the CPU 101 may modify the stored state of the IP address in the list of the Import.txt stored in the USB memory 200. For example, the CPU 101 may delete the just-imported IP address in S90 from the Import.txt file or may add a special mark to the IP address imported in S90 in the list of the Import.txt so that the IP address used (imported or written) in S90 can be identified in the list. This process enables used IP addresses (i.e., written IP addresses) to be identified in order to prevent an IP address from being applied redundantly to multiple MFPs.

However, in a case where the CPU 101 determines in S68 that there is no matching manufacturing number (serial number) in the list (S68: NO), the CPU 101 skips S70 and ends the configuration information writing process.

The configuration information writing process of FIG. 8 assumes that a list correlating IP addresses with pieces of device-specific information for individual devices is included in either the Import.txt file or the Import.bin file. However, the correspondence list may be included in a separate file, such as an Iplist.txt file in the text format and this separate file (the Iplist.txt) may be stored in the USB memory 200 together with the Import.txt file or the Import.bin file. The separate file (the Iplist.txt) includes a correspondence list 230 shown in FIG. 10(b). The correspondence list 230 includes node names ("alpha", "beta", and "gamma") in addition to IP addresses. The IP address may be updated by referring to the separate file (the Iplist.txt) in S70. By using the correspondence list 230, the CPU 101 may write the node name corresponding to the MFP 100 to a prescribed area in the NVM 104, in addition to writing the IP address in S70.

Returning to FIG. 7, in S48 the CPU 101 encrypts the Import.txt file as the plaintext import instruction information 210 using the encryption key set in S20 or S22 described above to generate the Import.bin file as the encrypted import instruction information 215 and stores the Import.bin file in the USB memory 200. Note even when the device password is updated in S64, in S48 the Import.txt file is encrypted by using the device password at the time of S22, that is, before updating the device password. It is assumed that the user may set the same device password for the plurality of MFPs 100 and wish to execute the importing process for the plurality of MFPs 100 by using the single USB memory 200. In such cases, when the importing process is executed in one of the MFPs 100, in S48 the Import.txt file is encrypted by using the same device password set by the user. Subsequently, when the importing process is executed in another MFP 100, in S30 another MFP 100 can decrypt the Import.bin file by using the same device password. Accordingly, the importing process can be executed by the single USB memory 200.

In S50 the CPU 101 deletes the Import.txt file from the USB memory 200. In other words, the CPU 101 replaces the plaintext import instruction information 210 with the encrypted import instruction information 215. In S52 the CPU 101 resets the initial state flag to "0" and ends the importing process.

As described above, the MFP 100 according to the embodiment is provided with: the NVM 104 that stores the device password of the MFP 100 and the configuration information including operating settings for the MFP 100; the CPU 101 that performs operations based on the configuration information; and the USB interface 107.

When the USB memory 200 storing the import configuration information is connected to the USB interface 107, the CPU 101 determines whether the authentication skipping condition, which includes a condition that the device password is not changed from the initial value, is satisfied. In a case that the authentication skipping condition is satisfied, the CPU 101 permits importing the configuration information from the USB memory 200 without performing the authentication using the device password. In a case that the authentication skipping condition is not satisfied, the CPU 101 performs the authentication using the device password, and then permits importing the configuration information from the USB memory 200.

As described above, in a case that the authentication skipping condition is satisfied, the CPU 101 permits importing the configuration information from the USB memory 200 without performing the authentication using the device password. Accordingly, when a plurality of MFPs 100 satisfies the authentication skipping condition, the configuration information can be imported to the plurality of MFPs 100 by using the single USB memory 200.

The MFP 100 in the embodiment is an example of the "information processing device." The NVM 104 is an example of the "storage." The CPU 101 is an example of the "controller." The USB interface 107 is an example of the "Input/Output interface." The USB memory 200 is an example of the "storage medium."

The authentication skipping condition includes a condition that the device password is not changed from its initial value and a condition that values, which the user can change, are maintained to their initial values.

Because the authentication skipping condition is defined strictly as described, MFPs 100 that import the configuration information without performing the authentication using the device password are well selected, thereby protecting the MFPs 100 against unsecure or careless modification of settings thereof.

The authentication skipping condition includes a condition that the device password is not changed from its initial value and a condition that the value that increases while using the MFP 100 is less than or equal to the prescribed value.

Because the authentication skipping condition is defined strictly, MFPs 100 can be protected properly against unsecure or careless modification of settings thereof.

The MFP 100 includes the print engine 111 for printing an image on a sheet. The authentication skipping condition includes a condition that the device password is not changed from its initial value and a condition that the process unit 192 used by the print engine 111 is not mounted on the MFP 100.

Because the authentication skipping condition is defined strictly, MFPs 100 can be protected properly against unsecure or careless modification of settings thereof.

The process unit 192 is an example of a cartridge.

The USB memory 200 stores the import instruction information. The import instruction information includes the device password used for authentication to login to the MFP 100. In a case where the authentication skipping condition is not satisfied, the CPU 101 executes the authentication by comparing the device password included in the USB memory 200 with the device password stored in the NVM 104.

Thus, in a case where the authentication skipping condition is not satisfied, the device password included in the import instruction information is used. Accordingly, the user can omit task to input the device password.

The CPU 101 imports the device password included in the import configuration information 220 in the NVM 104 as a new device password of the MFP 100.

Accordingly, after the importing is complete, the device password of the MFP 100 can be replaced from the initial value to the device password included in the import configuration information 220, thereby improving the security of the MFP 100.

The MFP 100 includes the print engine 111 for printing an image on a sheet. The import configuration information includes setting values for printing by using the print engine 111.

While the disclosure has been described in detail with reference to the specific embodiment thereof, it would be apparent to those skilled in the art that various changes and modifications may be made therein without departing from the scope of the invention.

(1) In the embodiment, the MFP 100 is described as an example of the information processing device. However, the information processing device may be a single printer, a single scanner, or a copy machine.

(2) In the embodiment, the MFP 100 does not have a facsimile function. However, the MFP 100 may have the facsimile function.

(3) In the embodiment, the CPU 101 is used as an example of a controller. However, instead of the CPU 101, a dedicated circuit may be used as an example of the controller, such as an ASIC (Application Specific Integrated Circuit) or FPGA (Field Programmable Gate Array).

(4) In the embodiment described above, the USB interface 107 is used as an example of the Input/Output interface. The Input/Output interface reads information from a connected storage medium and writes information to the connected storage medium. The storage medium is a portable storage medium from which the MFP 100 can read the information via the Input/Output interface and to which the MFP 100 can write information via the Input/Output interface. In addition to the USB memory 200, a memory card or the like may be used as the storage medium. In addition to the USB interface 107, a memory card reader/writer, or a wireless interface such as the Near-Field Communication (NFC) interface or the Bluetooth (registered trademark) interface may be used as the Input/Output interface. Secure Digital Input/Output (SDIO) may also be employed as the Input/Output interface.

(5) In the embodiment described above, the plaintext import configuration information 220 is imported into the MFP 100 when the USB memory 200 is connected to the MFP 100 while the operator is pressing the Stop key 106*a*. However, the operated key is not limited to the Stop key 106*a* but may be one or a plurality of special keys, or special keys or icons displayed on the panel 105, or their combination.

(6) In the embodiment described above, the encrypted import configuration information 225 (Backup.bin file) is stored in the USB memory 200 and is decrypted using the data password in order to import the plaintext import configuration information 220 (Backup.json file) into the MFP 100. However, the plaintext import configuration information 220 may be stored in the USB memory 200 and imported directly in the importing process.

(7) In the embodiment described above, the device password is stored in the NVM 104, but the device password may be stored in the ROM 102.

What is claimed is:

1. An image forming device comprising:
an image forming engine configured to form an image;
a memory storing configuration information and a device password;
an input output interface; and
a controller configured to operate based on the configuration information, the controller configured to perform:
in a case where a storage medium is connected to the input output interface:
determining whether an authentication skipping condition is satisfied, the authentication skipping condition including a condition that the device password is maintained to an initial value;
importing the setting configuration information from the storage medium to the memory without performing authentication using the device password in a case where the authentication skipping condition is satisfied; and
importing the setting configuration information from the storage medium to the memory after performing authentication using the device password in a case where the authentication skipping condition is not satisfied,
wherein after the import configuration information is imported, the controller operates according to the import configuration information.

2. The image forming device according to claim 1, wherein the import configuration information further includes settings information for forming the image using the image forming engine,
wherein after the import configuration information is imported, the controller controls the image forming engine according to the settings information included in the import configuration information.

3. The image forming device according to claim 1, wherein the configuration information includes an operation setting value, the operation setting value being changeable from an initial value,
  wherein the authentication skipping condition further includes a condition that the operation setting value is not changed from the initial value.

4. The image forming device according to claim 1, wherein the authentication skipping condition further includes a condition that a value that increases while using the image forming device is less than or equal to a prescribed value.

5. The image forming device according to claim 1, wherein the image forming engine is configured to print an image on a sheet while using a cartridge mounted on the image forming device,
  wherein the authentication skipping condition further includes a condition that the cartridge is not mounted on the image forming device.

6. The image forming device according to claim 1, wherein the storage medium further includes import instruction information,
  wherein the import instruction information includes a device password used for the authentication,
  wherein the performing authentication compares the device password included in the import instruction information with the device password stored in the memory.

7. The image forming device according to claim 1, wherein the import configuration information stored in the storage medium includes a device password to be imported in the memory,
  wherein the controller is configured to further perform importing the device password in the import configuration information to the memory.

8. A method for controlling an image forming device, the image forming device including: a memory storing configuration information and a device password, the configuration information; and an input output interface, the image forming device operating according to the configuration information, the method comprising:
  in a case where a storage medium is connected to the input output interface:
    determining whether an authentication skipping condition is satisfied, the authentication skipping condition including a condition that the device password is maintained to an initial value;
    importing the setting configuration information from the storage medium to the memory without performing authentication using the device password in a case where the authentication skipping condition is satisfied; and
    importing the setting configuration information from the storage medium to the memory after performing authentication using the device password in a case where the authentication skipping condition is not satisfied,
  wherein after the import configuration information is imported, the image forming device operates according to the import configuration information.

* * * * *